United States Patent
Chatterjee et al.

(10) Patent No.: US 8,214,544 B2
(45) Date of Patent: Jul. 3, 2012

(54) REGISTER ACCESS PROTOCOL

(75) Inventors: Manjirnath Chatterjee, San Francisco, CA (US); Rob Tsuk, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 203 days.

(21) Appl. No.: 12/827,101

(22) Filed: Jun. 30, 2010

(65) Prior Publication Data

US 2012/0005382 A1   Jan. 5, 2012

(51) Int. Cl.
*G06F 3/00* (2006.01)
(52) U.S. Cl. ............................. 710/9; 711/154
(58) Field of Classification Search .............. 710/105, 710/8–11; 711/154
See application file for complete search history.

(56) References Cited

U.S. PATENT DOCUMENTS 7,631,170 B2 * 12/2009 Dowling ................. 712/225
2010/0257534 A1 * 10/2010 Cismas et al. ............ 718/103

\* cited by examiner

*Primary Examiner* — Clifford Knoll

(57) ABSTRACT

A system and a method are disclosed for allowing a host device to communicate with an accessory device using a lightweight communications protocol. A communications link is first established between the connected accessory and host device. The host device sends a request for a register map file (RMF) to the accessory device. A RMF identifies registers for elements of the accessory device. The accessory device sends the RMF to host device, responsive to the request and the host device maps the RMF to interface with a higher level language such as C++ or JavaScript, allowing the host to act on the register mapping. Such interaction can be handled at the driver layer of an operating system, the application framework layer or the application layer. This permits both a layered service model and a fine-grant access at the application layer of the host device.

24 Claims, 7 Drawing Sheets

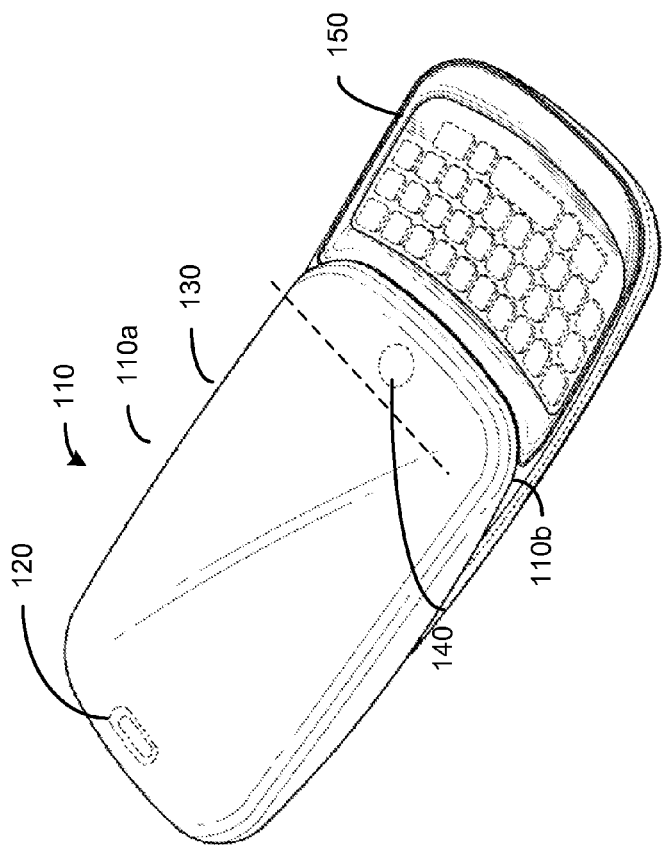
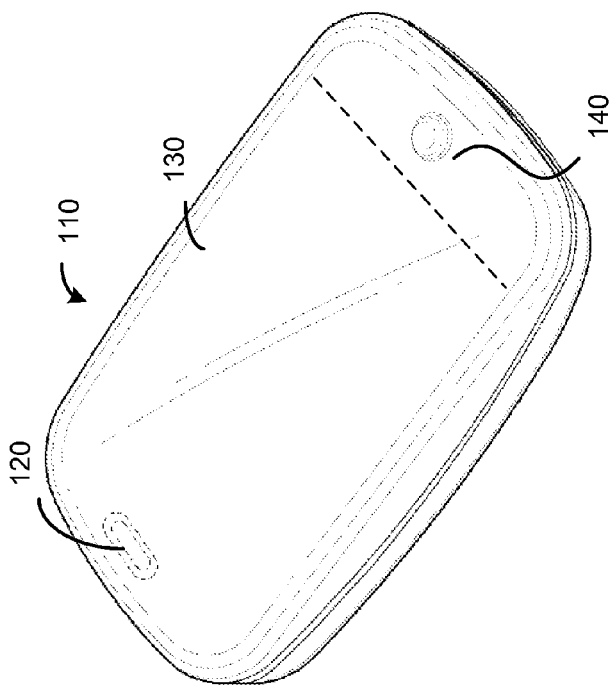
FIG. 1b
FIG. 1a

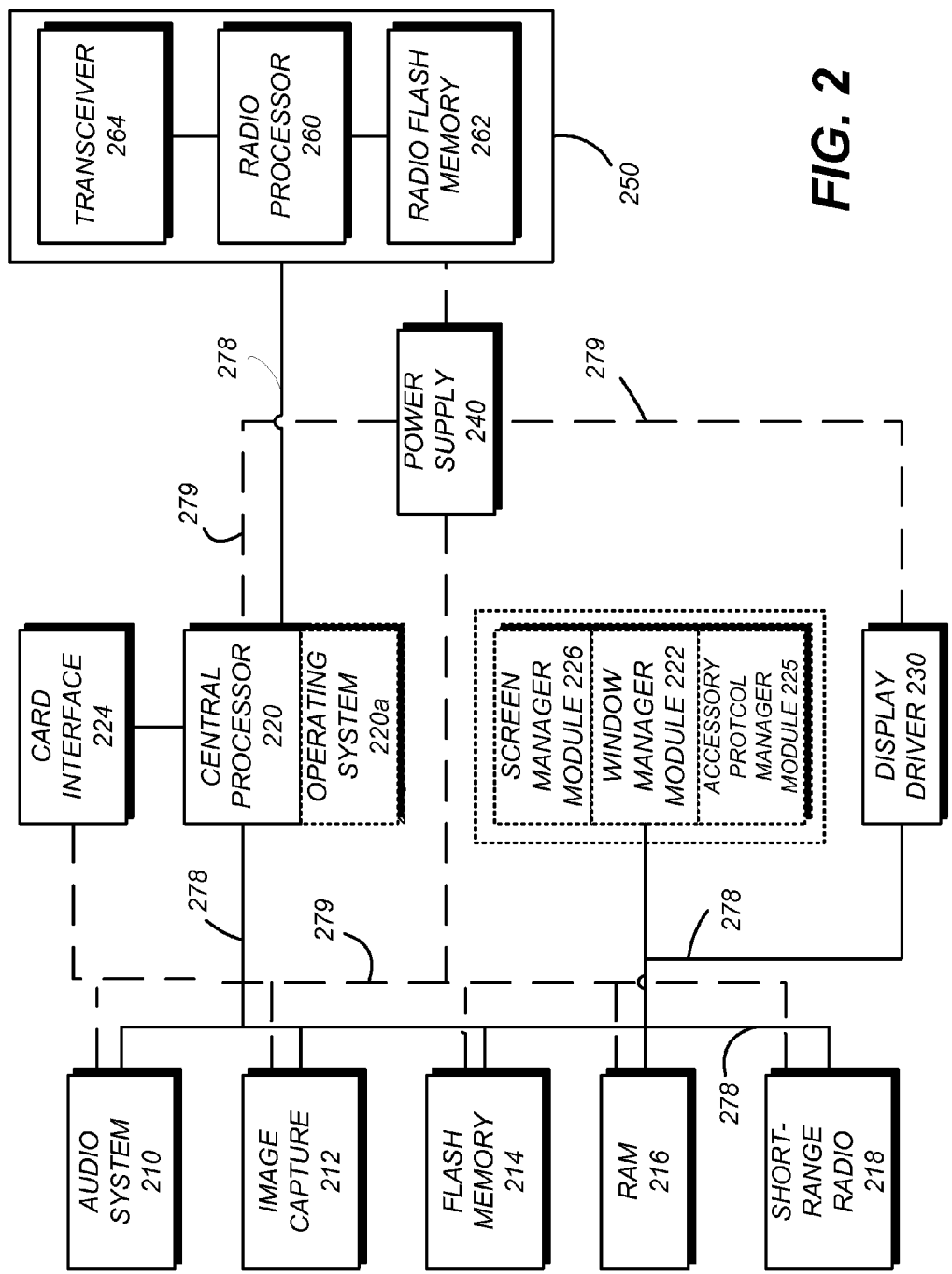

```
JSON-like Variant : Could Also be XML  ;comments in orange
Peripheral sends:
{
    ;Boiler plate block
    "V":"0101"                            ; c byte (8.8) protocol version
    "M":"PALM"                            ; Manufacturer number (4 bytes, UTF8]
    "T":"12345678"                        ; Type (model) number (8 bytes hex]
    "I":"abcd0123456789"                  ; ID (serial) number [16 hex]

;Connection block
    "PHY:I2C"
    "A":"0x31"

;Register Mapping block
    "0x0000:temp":"i1r"                   ; reg addr 0, name='temp', size 1 byte int read only
    "0x0001:LED" :"i1rw"                  ; reg addr 1, name='LED', size 1 byte int r/w
                                          ;.. writes set brightness, reads report brightness
    "0x0002:VoltOut":"i2rw"               ; reg addr 2, name='LED', size 2 byte int r/w
                                          ;.. writes sets touchstone volts, reads read volts
    "0x0004.0:enable":"brw"               ; bit flag, address 4, bit 0, read/write, name='enable'
    "0x0004.1:present":"br"               ; bit flag, address 4, bit 1, read/write, name='present'
    "0x0006:display":"i128rw"             ; reg addr 6, 128 byte mem block, r/w
}
```

502 — Boiler plate block
504 — Connection block
506 — Register Mapping block

```
.. JS preamble and constructor [e.g. prototype style]
\\ [this section could be merged with the MojoFramework]
function FunkyPalmAccy(regs) {
    this.registers = regs;
    this.getTemp = fuction() {return regs[0];}
    this.setLED = function(var) {regs[1]=var;  //code to map reg1}
    this.getLED = function() {return regs[1];}
    this.setDisplayPix (x,y, pix) {regs[6+x+y*160]=pix;}
    this.getDisplayPix (x,y) {return regs[6+x+y*160];}
}
...
\\ use the attached register mapped device from Mojo
myNewDevice = new FunkyPalmAccy(([symgr].getRegisterMap()))

\\ High level code
myNewDevice.setLED(75); // set LED to 75 units bright
alert(myNewDevice .getTemp); // alert with temp in box on screen
...
```

FIG. 6

REGISTER ACCESS PROTOCOL

BACKGROUND

1. Field of Art

The disclosure generally relates to the field communication protocols for communicatively coupling peripheral devices to host devices.

2. Description of the Related Art

Generally, a host (or primary) device, for example, a mobile computing device 110, may seek to communicate with an accessory (or peripheral) device that seems to connect with it. However, host devices generally use higher-level programming languages such as JavaScript while low-level accessory devices generally do not provide register mapping that supports such a high-level programming language. Thus currently, there is no way for a host device using a high-level language such as JavaScript or other virtual machine/scripting languages to directly drive or operate a peripheral device.

Hot pluggable peripheral device communication buses are well known in the art. For example, universal serial bus (USB) is an external bus standard that supports data transfer rates of up to 12 megabits per second. A single USB port can be used to connect many peripheral devices, such as mice, modems, keyboards, and the like. Another external bus standard is IEEE 1394, also commonly referred to as Firewire-I-link and/or Lynx. IEEE 1394 is a very fast external bus standard that supports data transfer rates of up to 400 megabits per second. A single IEEE 1394 port can also be used to connect several external devices. Both IEEE 1394 and USB support plug and play and hot plugging installations, and also provide power to the connected peripheral devices.

The problem with USB and IEEE 1394 is that they require complex communication protocols to handle bus arbitration functionality and other complex communication tasks. In many instances, these complex protocols are not necessary and it is desirable to have a more simplified communication protocol. For example, when dealing with peripheral devices with simple I/O functions such as lights, switches, temperature sensors, ambient lights etc., it is preferable to have a simple communications protocol which is fast.

Another method for communicatively coupling a host device using a higher-level computer program with an accessory device is to use a device driver. Device drivers, implemented as software modules or components that can be integrated into an operating system, are typically used to provide well defined software application program interfaces (APIs) to the operating system and application programs for each of the hardware interfaces. Device drivers often provide a degree of device independence or virtualizing that may simplify the interaction of an application program or operating system with the specifics of a particular class of hardware interface.

Conventionally, a device driver must be downloaded and installed for each peripheral device connected to the host device. In such a case, there is always a possibility that a host device user will perform an improper operation in installing the peripheral device driver software. That may particularly be the case if the device driver software includes device drivers for several different peripheral devices and/or if the host device user is required to make certain selections or settings during installing the device driver software, which can increase the chance of the computer user making errors in installing the device driver software Moreover, from the vantage point of the manufacturer of the peripheral device, requiring packaging the device driver software with each peripheral device has the obvious drawback of increasing costs. Moreover, it often occurs that errors in device drivers are discovered or device drivers are updated after they have been shipped with peripheral devices. In that instance, the device driver software provided with the peripheral device may not be the most up-to-date version of the device driver or may contain minor flaws or bugs, which is also obviously problematic for the computer user.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 1a and 1b illustrate one embodiment of a mobile computing device.

FIG. 2 illustrates one embodiment of a mobile computing device architecture.

FIG. 5 illustrates one embodiment of a register map file mapping I/O space for elements of an accessory device.

FIG. 6 illustrates one embodiment of a mapped register map file such that a higher-level language can interact with the register map file.

DETAILED DESCRIPTION

Figure 3:
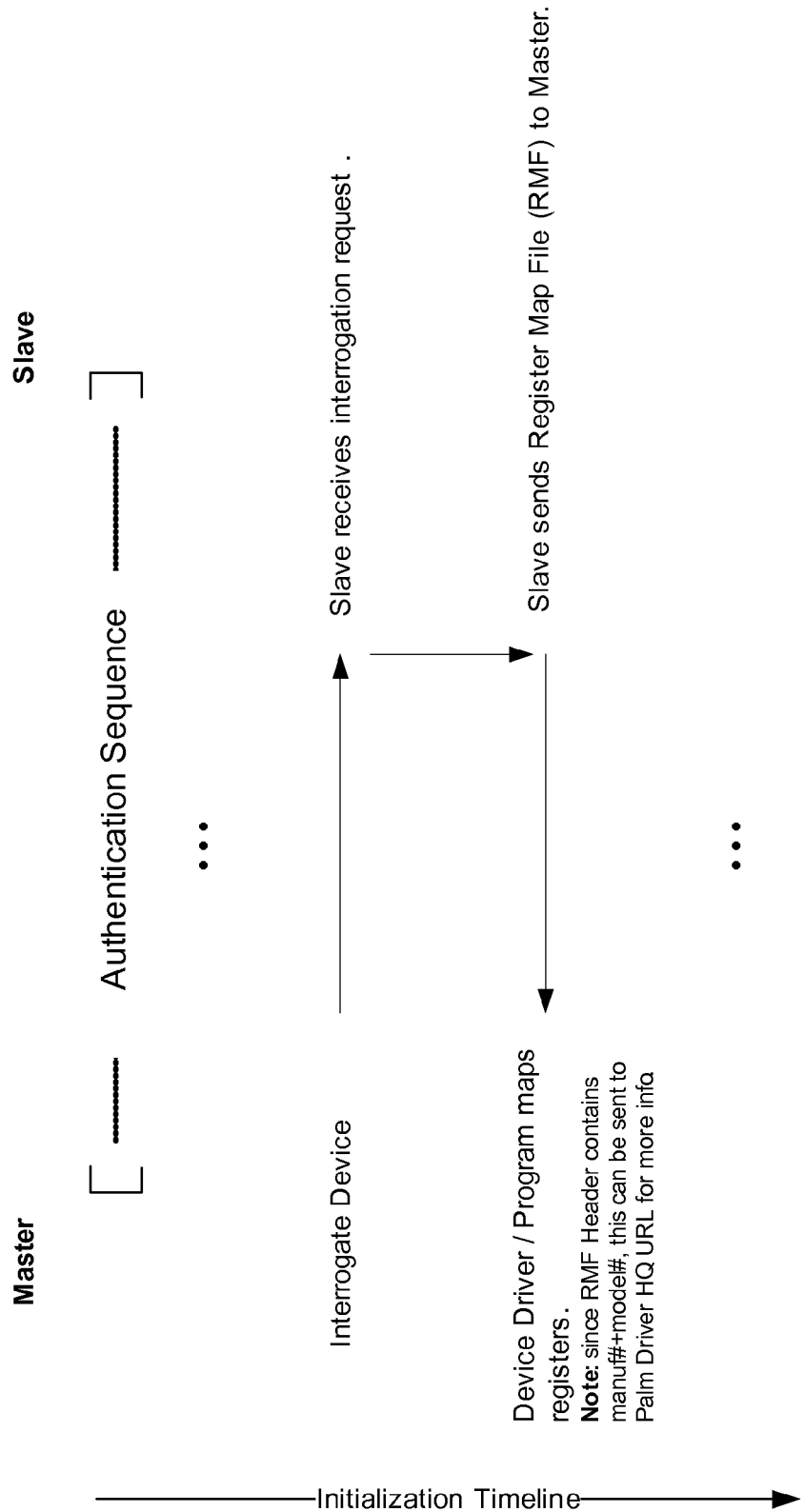
FIG. 3 illustrates one embodiment of a startup (or initialization) sequence for a software program using a pre-defined structured contract.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system (and method) includes a system (and method) that is configured to allow a host device to communicatively couple and interface with a low-level registers of an accessory device. The figures depict embodiments of the disclosed system (or method) for purposes of illustration only. One skilled in the art will readily recognize from the following description that alternative embodiments of the structures and methods illustrated herein may be employed without departing from the principles described herein.

One embodiment of a disclosed system (and method) includes a system (and method) executable on a host device that is configured to communicate with a connected accessory device. The method comprises first establishing a communications link with the connected accessory device. The communications link may comprise determining that a peripheral device is connected, performing an authentication sequence or a handshake with the accessory device. Additionally, the method includes the step of sending an interrogation request to the accessory device. The interrogation request may be performed via register read/write commands. A register map file is received from the accessory device in response to the interrogation request. A register map file comprises of a code block describing the device, a code block describing the location of the accessory device and a code block identifying variables to be set and read among the accessory device's exposed registers. Once the register map file is received, it is mapped as a higher-level programming language object. The mapping identifies each register to be set or read on the accessory device and converts the code to set or read each register to a higher-level programming code. The object is named, allowing a higher-level program to call up the mapping of the registers and define actions on the accessory device.

Example Mobile Computing Device

In one example embodiment, the configuration as disclosed may be configured for use between a mobile computing device, that may be host device, and an accessory device. FIGS. 1a and 1b illustrate one embodiment of a mobile computing device 110. Figure (FIG.) 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook computer, notebook computer, a tablet (or pad) computer, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a solid-state based gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes one or more processors (for ease of discussion referenced as a central processor 220), a power supply 240, and a radio subsystem 250. The central processor 220 is configured for operation with a computer operating system. The operating system is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system is to handle the details of the operation of the mobile computing device 110.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

An accessory protocol manager module 225 comprises software that is, for example, integrated with the operating system or configured to be an application operational with the operating system. In some embodiments it may comprise firmware, for example, stored in the flash memory 214. The accessory protocol manager 225 is configured to store the instructions and data corresponding to the processes disclosed herein, for example, with respect to FIGS. 3 and 4. For example, the accessory protocol manager includes the logic for computing and storing checksums within the device 110 as further described herein.

In one embodiment, central processor 220 executes logic (e.g., by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) or higher mobile, Long Term Evolution (LTE), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Communication Sequence at Connection

To ensure authorized communication between a first device and a second device, a communication protocol is created to ensure coupling and subsequent communication between the two devices. In an example embodiment, the first device is an accessory (or peripheral) and the second device is a host computing device, e.g., the mobile computing device 110. Turning first to FIG. 3, it illustrates one embodiment of a startup (authentication) sequence and subsequent communication sequence for a software program using the described communications protocol. In this example, a user attaches an accessory (or slave) device to the mobile computing (or master) device 110. However, prior to this process occurring, the accessory and the mobile computing device 110 are configured to exchange messages (here, an authentication sequence) to confirm that the accessory can communicate with the mobile computing device 110. In this context, in one example embodiment the accessory is configured to initiate the authentication sequence. In addition, the accessory protocol manager 225 in the mobile computing device is configured to include instructions that correspond to initiating an authentication sequence.

Once the authentication sequence is complete, the host device sends an interrogation request to the accessory, requesting a register map file. The interrogation and communication between the two devices is performed via register read/write commands. Generally, low level hardware devices have a small file that maps virtual I/O space for elements of accessory devices, such as memory, server, etc. Such a file or a register map file is received by the by the host device. Once received by the host device, a program on the host device maps the registers of the accessory device to a data object. The method of mapping the registers to a data object is described in further detail below in reference to FIGS. 4, 5, 6 and 7. The data object is accessible by a kernel/system layer or the application layer of the host device such that a command executed in the programming language of the host device, such as JavaScript, can interface with registers in the accessory device.

Communication Between Peripheral and Host Device

Figure 4:
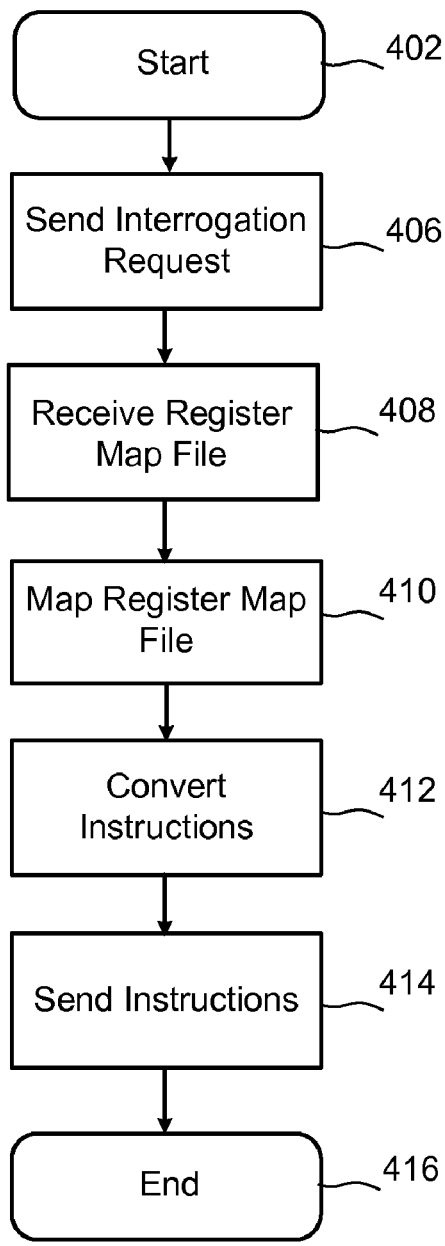
FIG. 4 illustrates one embodiment of process steps for a host device to communicate with a low-level hardware accessory device.

FIG. 4, illustrates a flow chart of a process to map registers of an accessory device. The process starts 402 once an accessory device is connected to the host device. Once the two devices are connected, the process includes the steps of sending 406 an interrogation request to the accessory device, receiving 408 register map file from the accessory device, responsive to the interrogation request, mapping 410 the register map file. Additionally, the process includes steps of generating instructions for the accessory device, converting 412 the instructions, and sending 414 the converted instructions to the accessory device. In one embodiment, the process ends 416 once the instructions are sent to the accessory device 414.

The process starts 402 once the accessory device and the host device are communicatively coupled. In one embodiment, the communication coupling may be a wired connection, such as USB, Palm Enhanced USB, 12C, SPI, serial port, parallel port or the like or it may be a wireless connection such as UWB, Wibree, Bluetooth, Zigbee, WiFi or the like. In another embodiment, the process starts 402 once an authentication sequence has been established between the host and the accessory device. One example of an authentication sequence includes establishing a presence of the accessory device on the host device.

Once the host device and the accessory devices are communicatively coupled and the process starts 402, the host device sends 404 an interrogation request to the accessory device. In one embodiment, the interrogation request is a read/write operation to receive a register map file from the connected accessory device. Responsive to the interrogation request, the accessory device sends a register map file. A register map file provides a mapping of registers of an accessory device which are exposed and can be read, write, read/write etc.

FIG. 5 is an exemplary illustration of a register map file. In one embodiment, the register map file is written as JavaScript. In another embodiment, the register map file may be compiled as a text file from the perspective of the peripheral device. In another embodiment, the register map file may be written as a JavaScript Object Notation (JSON) like variable or as name-value pairs or triplets or in XML. The register map file 500, illustrated in FIG. 5 is written in JSON format. The boiler plate block 502 provides a device description. For example, "M": "PALM" provides a manufacturer description for the peripheral device, indicating that a corporation, Palm in this example, is the stated manufacturer of the peripheral device. The connection block 504 provides a description of the physical connection between the host device and the peripheral. "PHY:I2C," for example describes that there is a physical connection between the host and the peripheral over an I2C connection. Such a description identifies to the host how to find the peripheral device. The register mapping block 506 describes items that can be set and read among registers. For example, in code line "0x0006.1:VoltOut":"i128rw," the first six values describe the register location. In this example the register address is 6. The number after the register address provides the bit number. In the above code line the bit value is 1. The names after the bit value represents a particular action that may be performed. In the example code above, a read operation on the register retrieves the voltage associated with the accessory device. A write command sets the voltage out for the peripheral device. The "i" after the name, represents an integer and the number "128" in the above code represents the number of bytes. The "rw" represents read, write or read/write operations that are possible in reference to the registers. In other embodiments, other operations may be performed.

Referring now to FIG. 4 and continuing with the embodiment described above, the register map file is received 408 by the host device via read/write operations. Once the register map file is received 408 by the host device, the register map file is mapped 410. In one embodiment, a universal service maps registers to names and exposes them to JavaScript. For example, if the register map file 500 contains JSON data received as a string, the JSON data is used to generated JSON object in JavaScript code. In one embodiment calling 'eval( )' is used to generate JSON object in JavaScript code. Once JSON object is generated, a '.notation' format is used to access its properties. As shown in FIG. 6, the JSON string data of FIG. 5 is used to generate a JSON object. Thus "this.setLED=function (var) {regs[1]=var" can be used to perform a write operation on register 1. Additionally, other runtime operations can be used, such as: get/set a bit, get/set a byte, get/set 2b int, get/set 4b int, write a string of bytes, read a buffer of bytes. In other embodiments, JSON arrays indicating lights, switches etc are accessed through get/set bits at the JavaScript level. Temperature sensors or light sensors can be accessed through get/set byte. IDs such as serial numbers or single line displays are accessed through buffers.

In another embodiment, the register map file 500 is cached and the name and register values are stored in a table. In an embodiment where the register map file 500 is in XML format, the XML file is used to generate a JavaScript object by parsing the XML string data and assigning the data to variables through methods such as Document Object Model (DOM) APIs.

Once the register map file 500 is mapped to interface with a higher level computer language. The configuration allows the driver layer of an operating system, the application framework layer or the application layer to act on the registers of the connected accessory device. In another embodiment, the register map file has multiple claimed mapping allowing several high level programs to interface with it. For example, an application may instruct the peripheral device to set an LED to 75 units bright. In such an embodiment, the host register values can be changed while the service and the drive layers remain ignorant.

Referring again to FIG. 4, instructions from the host device to interact with the peripheral device are generated in JavaScript or a high level programming language. However, a low-level peripheral disclosed herein cannot act upon JavaScript instructions. Thus, the instructions must be converted 412. In an embodiment wherein the high level code map of the register map file is a JSON object, the JavaScript compiler converts the instructions in JSON array form. In another embodiment, DOM APIs may be used to convert instructions to XML string format. The converted instructions are sent 414 to the peripheral device using register read/write operations over a communications link. In one embodiment, a register read operation is performed on a specified register to determine the brightness of an LED. Once the register read/write operations have occurred, the process may end 416.

Figure 7:
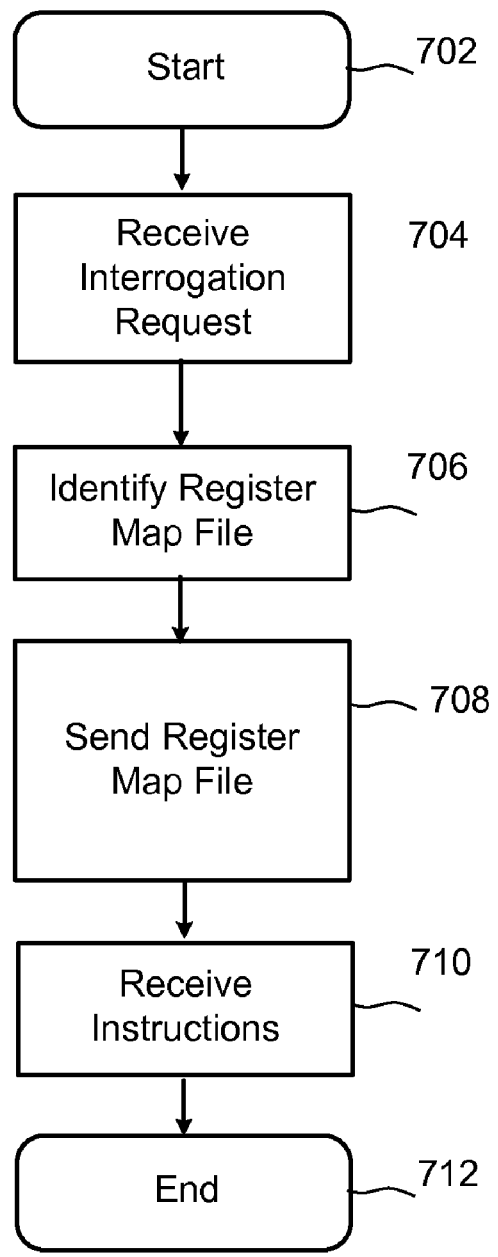
FIG. 7 illustrates one embodiment of process steps for an accessory device to communicate with a host device.

FIG. 7 illustrates a process diagram of communication that occurs on a host device. The process starts 702 once a communications link is established between the host device and the accessory device. The process includes the steps of receiving an interrogation request 704 from a host device, identifying a register map file 706, sending the register map file 708 to the host device responsive to the interrogation request. Additionally, operation instructions may be received 610 from the host device to operate the peripheral device through register read/write operations. The process ends 710 once communication between the host and the peripheral device is established.

The process starts 702 once the accessory and host devices are communicatively coupled. The communication link may be wired or wireless as described above in reference to FIG. 4. Once the communications link is established, the accessory device receives 704 an interrogation request. In one embodiment, the interrogation request is performed via register read/write operations. Responsive to the interrogation request 704, the accessory device identifies 706 a register map file. In one embodiment, a register map file of an accessory device is a file that maps virtual I/O space for elements of the device. An exemplary register map file 500 is described in greater detail above in reference to FIG. 5. Once the register map file 500 is identified 706, the file is sent 708 to the host device. In one embodiment, the host device maps the sent register map file by naming the registers and exposing them to JavaScript. The mapping process is described in greater detail above, in reference to FIGS. 4, 5 and 6.

Once a JavaScript accessible map of the register map file is created on a host device, the host device can act on one or more registers. In one embodiment, the host device acts on the accessory device registers by sending an instruction to the accessory device. In one embodiment, the instructions may be generated in the host device at a JavaScript level. In the embodiment, the instructions may first be converted to JSON array before being sent to the peripheral device. Once the instructions are received 710 by the accessory device, the instructions are executed 712 using register read/write commands.

The configurations described provide several advantages and benefits to using a device driver to operate low-level accessory devices. For example, the configurations provide a simple lightweight protocol to allow a host device to interact with registers of low-level hardware peripherals, such as haptic drives, sensors, small uCs, Bluetooth pairing IDs or docks with momentary switches, slide switches, 2 lights, temperature sensors etc. Additionally the configurations disclosed herein obviate the need to ship an accessory device with a software driver, saving shipping costs associated with it. The configurations obviate the need for a user to search and properly install a device driver, thus providing an improved user experience in operating the accessory device. The configurations also allow the driver layer of an operating system, the application framework layer or the application layer to act on the connected accessory device. This permits both a layered service model and a fine-grain access at the application layer to exist simultaneously. Thus, the driver layer access is preserved up to the highest level language.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium such as computer readable machine instructions (or software) corresponding to a process, for example, as described in any of FIG. 3-7) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled,"

however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for performing read/write operations on accessory device registers by a host device using a high-level language such as JavaScript through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method executable by host device for communicating with a connected accessory device, the method comprising:
    establishing a communications link with the connected accessory device;
    sending an interrogation request to the accessory device, the request being performed via register read/write commands and requesting a register map file;
    receiving a register map file responsive to the interrogation request, the register map file identifying registers for elements of the accessory device; and
    mapping the register map file, allowing one or more high level programming languages to interface with the registers comprising the register map file.

2. The method of claim 1, wherein the register map file comprises a file that maps virtual I/O space for elements of an accessory device.

3. The method of claim 1, wherein the received register map file is mapped using a universal service.

4. The method of claim 1, wherein the received register map file is mapped using a JavaScript compiler.

5. The method of claim 1, wherein the accessory device comprises a computing accessory and the host device comprises a computing device.

6. The method of claim 1, wherein the computing accessory comprises one of a physical accessory or a software accessory.

7. A computer readable storage medium, storing instructions thereon, the instructions when executed by a processor cause the processor to:
    communicatively couple with the host device;
    send an interrogation request to the accessory device, the request being performed via register read/write commands and requesting a register map file;
    receive a register map file responsive to the interrogation request, the register map file identifying registers for elements of an accessory device; and
    map the register map file, allowing one or more high level programming languages to interface with the registers comprising the register map file.

8. The computer readable storage medium of claim 7, wherein the register map file comprises a file that maps virtual I/O space for elements of an accessory device.

9. The computer readable storage medium of claim 7, wherein the received register map file is mapped using a universal service.

10. The computer readable storage medium of claim 7, wherein the received register map file is mapped using a JavaScript compiler.

11. The computer readable storage medium of claim 7, wherein the accessory device comprises a computing accessory and the host device comprises a computing device.

12. The computer readable storage medium of claim 7, wherein the computing accessory comprises one of a physical accessory or a software accessory.

13. A computer implemented method executable by an accessory device for communicating with a connected host device, the method comprising:
    receiving an interrogation request;
    identifying a register map file responsive to the interrogation request, the register map file identifying registers for elements of the accessory device; and
    sending the register map file to the host device.

14. The method of claim 13, wherein the communication between the host and the accessory device is performed using register read/write operations.

15. The method of claim 13, wherein the accessory device receives instructions from the host device to operate a register described in the register map file.

16. The method of claim 15, wherein the accessory device executes the instructions by performing read/write operations on the specified registers.

17. The method of claim 13, wherein the accessory device comprises a computing accessory and the host device comprises a computing device.

18. The method of claim 13, wherein the computing accessory comprises one of a physical accessory or a software accessory.

19. A computer readable storage medium, storing instructions thereon, the instructions when executed by a processor cause the processor within an accessory device to:
    communicatively couple with a host device;
    receive an interrogation request from the host device, the request for a register map file;
    identifying the register map file responsive to the interrogation request; and
    sending the register map file to the host device.

20. The computer readable storage medium of claim 19, wherein the communication between the host and the accessory device is performed using register read/write operations.

21. The computer readable storage medium of claim 19, wherein the accessory device receives instructions from the host device to operate a register described in the register map file.

22. The computer readable storage medium of claim 21, wherein the accessory device executes the instructions by performing read/write operations on the specified registers.

23. The computer readable storage medium of claim 19, wherein the accessory device comprises a computing accessory and the host device comprises a computing device.

24. The computer readable storage medium of claim 19, wherein the computing accessory comprises one of a physical accessory or a software accessory.

* * * * *